(12) United States Patent
Bailer et al.

(10) Patent No.: US 6,379,218 B1
(45) Date of Patent: Apr. 30, 2002

(54) MACHINE FOR MACHINING WORKPIECES WITH CUTTING TEETH, ESPECIALLY SAW BLADES

(75) Inventors: Norbert Bailer, Schemmerhofen-Altheim; Peter Bailer, Schemmerhofen; Peter Lenard, Biberach, all of (DE)

(73) Assignee: Vollmer Werke Maschinenfabrik GmbH (DE)

( * ) Notice: Subject to any disclaimer, the term of this patent is extended or adjusted under 35 U.S.C. 154(b) by 0 days.

(21) Appl. No.: 09/486,521
(22) PCT Filed: Sep. 24, 1998
(86) PCT No.: PCT/EP98/06078
§ 371 Date: Feb. 28, 2000
§ 102(e) Date: Feb. 28, 2000
(87) PCT Pub. No.: WO99/16569
PCT Pub. Date: Apr. 8, 1999

(30) Foreign Application Priority Data

Oct. 1, 1997 (DE) .......................................... 197 43 529

(51) Int. Cl.$^7$ ................................................ B24B 49/00
(52) U.S. Cl. .................................. 451/8; 451/56; 451/9
(58) Field of Search ............................... 451/5, 8, 9, 11, 451/10, 56, 65; 76/41, 43, 37, 48, 50, 77, 45

(56) References Cited

U.S. PATENT DOCUMENTS

| 4,483,217 A | 11/1984 | Beck et al. | |
|---|---|---|---|
| 4,819,515 A | * 4/1989 | Pfaltzgraff | ...................... 76/41 |
| 6,109,137 A | * 8/2000 | Lenard et al. | .................. 76/37 |

FOREIGN PATENT DOCUMENTS

| DE | 43 16 789 A1 | 11/1994 |
|---|---|---|
| DE | 196 30 057 C1 | 9/1997 |
| GB | 1530081 | 10/1978 |

* cited by examiner

Primary Examiner—Derris H. Banks
(74) Attorney, Agent, or Firm—Clifford W. Browning; Woodard, Emhardt, Naughton, Moriarty & McNett

(57) ABSTRACT

A workpiece slide (42) is guided on a workpiece slide guide means (40) which extends transversely of a pivot axis (A) determined by a machine bed (20), the workpiece slide (42) together with its workpiece support (44) defining a central plane (G) at right angles to the pivot axis (A). A feeler means (60) determines the distance of the cutting teeth (12) of a workpiece (10) from a workpiece support (44) when in a measuring position which the tooth tip (18) of a cutting tooth (12) oriented in the direction of the pivot axis (A) of a workpiece (10) received in the workpiece support (44) reaches upon shifting of the workpiece slide (42) in the direction of the pivot axis (A). The feeler means (60) comprises a barrier (70) the length L of which, as measured in the central plane (G) transversely of the workpiece slide guide means (40), is greater than the greatest tooth pitch (T) occurring of workpieces (10). The machine includes control programmed such that the feeler means (60) becomes active before the advance means (50) to scan the tip of a cutting tooth (12) irrespective of the position of the corresponding tooth face (14), and such that the workpiece (12) is scanned once more at the tooth tip (18) of the cutting tooth (12) whose tooth face (14) is in the desired position, and the position of the workpiece slide (42) is corrected if this tooth tip (18) does not lie on the pviot axis (A).

7 Claims, 7 Drawing Sheets

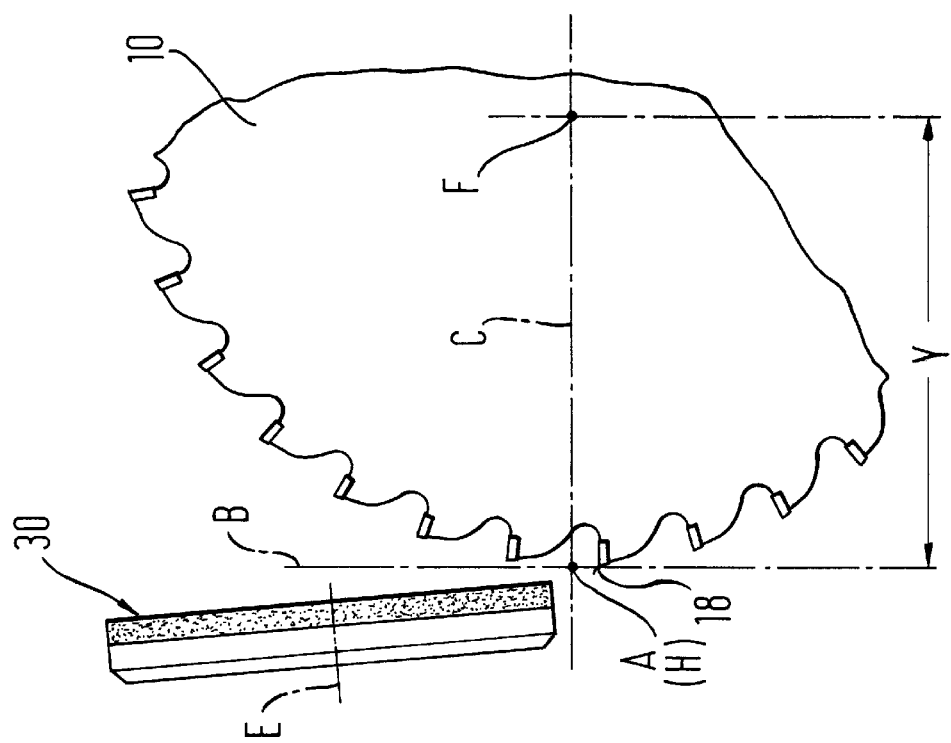
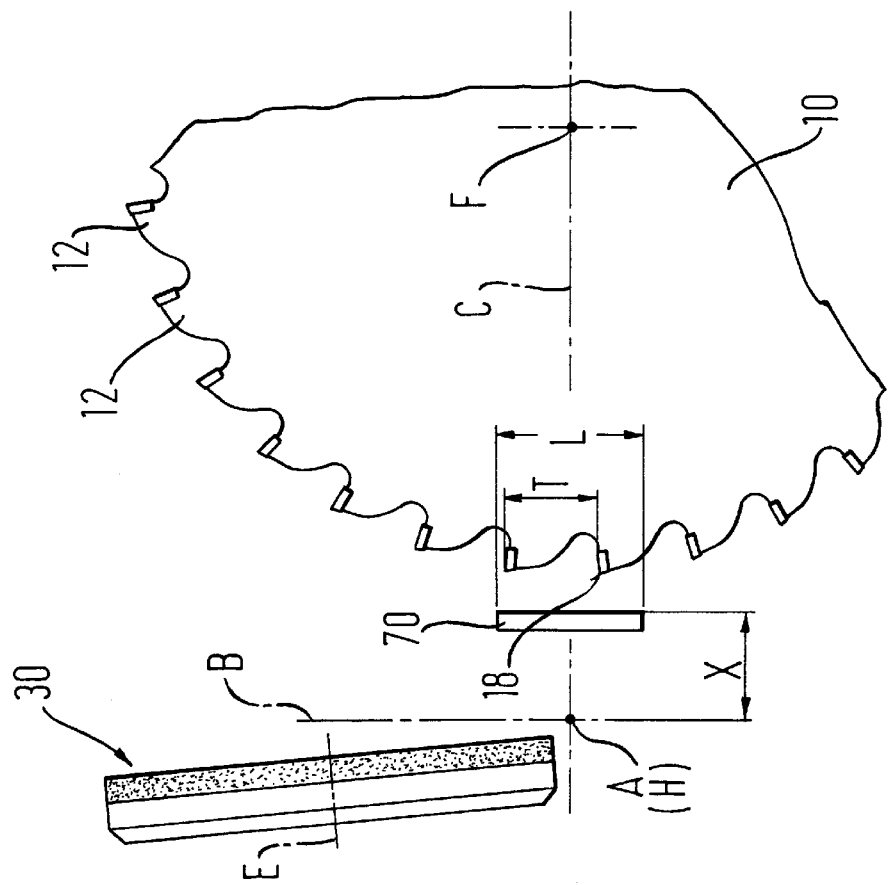

MACHINE FOR MACHINING WORKPIECES WITH CUTTING TEETH, ESPECIALLY SAW BLADES

The invention relates to a machine as defined in the preamble of claim 1.

Although machines of this kind, in the first place, are intended for grinding teeth of circular saw blades they also are suitable, in principle, for machining saw blades of band saws and gang saws as well as milling cutters and the like. Moreover, the work likewise may be done by way of electric discharge machining, using one or more rotating spark erosion discs. Accordingly, the instant invention is not limited to the grinding of teeth of circular saw blades.

Regardless of the general configuration and purpose of the workpieces to be machined and irrespective of the kind of machining to be accomplished, an initial dimension of each individual workpiece must be ascertained prior to beginning the work in order to be able to properly position the workpiece for the machining operation. In the case of circular saw blades, for instance, their diameter must be determined. The machining position envisaged in the case of a machine of the type in question usually is the position at which the tip of the cutting tooth to be machined lies on that axis of the machine which is defined as pivot axis. The tip of the tooth is understood to be a sharp edge defined by the intersection of a tooth face (cutting surface) and the back of the tooth, also called tooth flank (rake).

In order to be able to measure with sufficient accuracy the initial dimension of the workpiece essential for the machining process, this being the diameter in case of circular saw blades, by using the means available on a machine of the generic kind in question, the tip of at least one cutting tooth must be scanned while the corresponding tooth face is in the position it is desired to have. This desired position is determined by the tooth face lying in a plane which includes the pivot axis of the machine.

In a known machine of the type mentioned (DE 196 30 057 C1) the workpiece slide, including a workpiece to be machined having been donned on the workpiece support thereof, is displaced under numerical control along the workpiece slide guide means from a loading position to a position at which a tooth tip has approached the pivot axis of the machine. To be able to accomplish that, it is necessary for the essential magnitude of movement of the workpiece slide—the diameter of a circular saw blade—to be known at least approximately. That requirement is met when workpieces are to be machined which either are new or which had the same dimensions when new and, in the meantime, due merely to resharpening of their teeth, suffered changes which, although varying, remain within certain limits. Under these conditions a certain distance can be preset for a plurality of workpieces to be machined one after the other, the distance defining the displacement of the workpiece slide from its loading position into a position at which the advance means can engage in a tooth gap in order to push the adjacent tooth face into the desired position at which the feeler means, by scanning the corresponding tooth tip, can precisely measure the spacing thereof from the workpiece support, in other words the radius in case of a circular saw blade.

Difficulties are encountered, however, if the known machine of the generic kind in question is to be used for successively machining workpieces of different dimensions, for example, circular saw blades which have different diameters and possibly also different pitches. It would be a very expensive proposition to keep workpieces stored in a magazine in such orientation that the mere donning of each individual workpiece on the workpiece support offers adequate certainty that a tooth tip will result in a sufficiently well aligned position with respect to the pivot axis of the machine so that it can be scanned with satisfactory accuracy by the feeler means when the workpiece slide is pushed ahead. If there is no provision for such preorientation of the workpiece then there is the risk, with the known machine of the generic kind in question, that its feeler means, when moved into measuring position, will enter in a tooth gap and consequently provide an erroneous result of measurement, simulating a smaller workpiece than actually present, for example, a circular saw blade of smaller diameter than the actual one. If the machine were to start operating under these circumstances damages to the workpiece and possibly also parts of the machinery would be unavoidable. Therefore, it was believed to be indispensable up to now to provide the known machine of the generic type in question beforehand with the necessary input of relevant dimensions of the workpieces to be treated so that each individual workpiece donned on the workpiece support will be moved, by numerically controlled shifting of the workpiece slide, into a position at which the advance means can become effective in the way described in order to orient a cutting tooth such that it can be scanned properly by the feeler means.

It is the object of the invention to devise a machine for machining workpieces which have cutting teeth, especially saw blades, such that the machine can receive workpieces of widely differing relevant dimensions in random sequence, without any preorientation, and yet machine them fully automatically.

The object is met, in accordance with the invention, by the features of claim 1.

The design according to the invention of the feeler means makes sure that the frontmost cutting tooth in the direction of movement of the workpiece slide from its loading position towards the pivot axis of the machine will trigger a signal as soon as the tip of this cutting tooth reaches the barrier, even if this tooth tip does not face the pivot axis. In this manner a first dimension is obtained which is characteristic of the workpiece because the respective position of the workpiece slide and the location of the barrier are known to the numerical control means. Normally, the first value thus measured on the workpiece still differs too much from the actually relevant dimension of the workpiece, this being the diameter in the case of a circular saw blade, for any sophisticated machining of the workpiece to be initiated on the basis of this first measured value alone. In most cases, therefore, the first measured value needs some correction to be made. The amount of correction, however, can be determined easily as soon as the advance means has become effective in per se known manner, pushing a tooth face into the desired position at which it lies in a plane which includes the pivot axis of the machine. This tooth face need not be the one of the same cutting tooth of which the tip was sensed originally.

Different ways and means can be applied to sense or scan the tooth tip of the cutting tooth whose tooth face has been moved into the desired position by the advance means. One possibility is to again use the same feeler means which carried out the first measurement in order to find out the correction which is required of the value measured originally. Yet the feeler means must be of more complicated structure to be able to fulfill this task than is required for just obtaining the result of the first measurement.

In general, therefore, it is preferred to provide a separate correcting means, apart from the feeler means, for the renewed scanning of the workpiece and for generating correction signals. This means may comprise a feeler provided purely as such and for no other purpose.

In a particularly advantageous embodiment of the invention, however, the tool itself, provided for machining the workpieces, forms part of the correcting means. Thus, for example, a grinding or eroding disc with which the machine is equipped anyway is used for the renewed sensing of the workpiece. It may serve in different ways as a signal generator, such as by measuring vibrations caused by the workpiece being touched by the tool while the latter rotates.

Another way of obtaining the second measured value is by making the tool an electrically conductive member of an electric circuit which is closed through the workpiece.

There are various possible embodiments of the barrier of the first feeler means as well. For example, it may be a known type of light barrier. In consideration of the fact, however, that a risk of contamination is to be expected in the wider or narrower range around the tool, it is generally preferred to provide a barrier in the form of a physical obstacle which is moved into a sensing position upon request only, while it remains in a protected inoperative position during any machining operation on the workpiece.

A structure as recited in claim 5 is advantageous especially if the barrier is embodied by a physical obstacle since that requires more space than a light barrier.

Further advantageous features may be gathered from claim 6.

An embodiment of the invention will be described in greater detail below with reference to diagrammatic drawings, in which:

FIGS. 5–8 show successive operating positions of the machine in partial views similar to FIG. 3.

Figure 1:
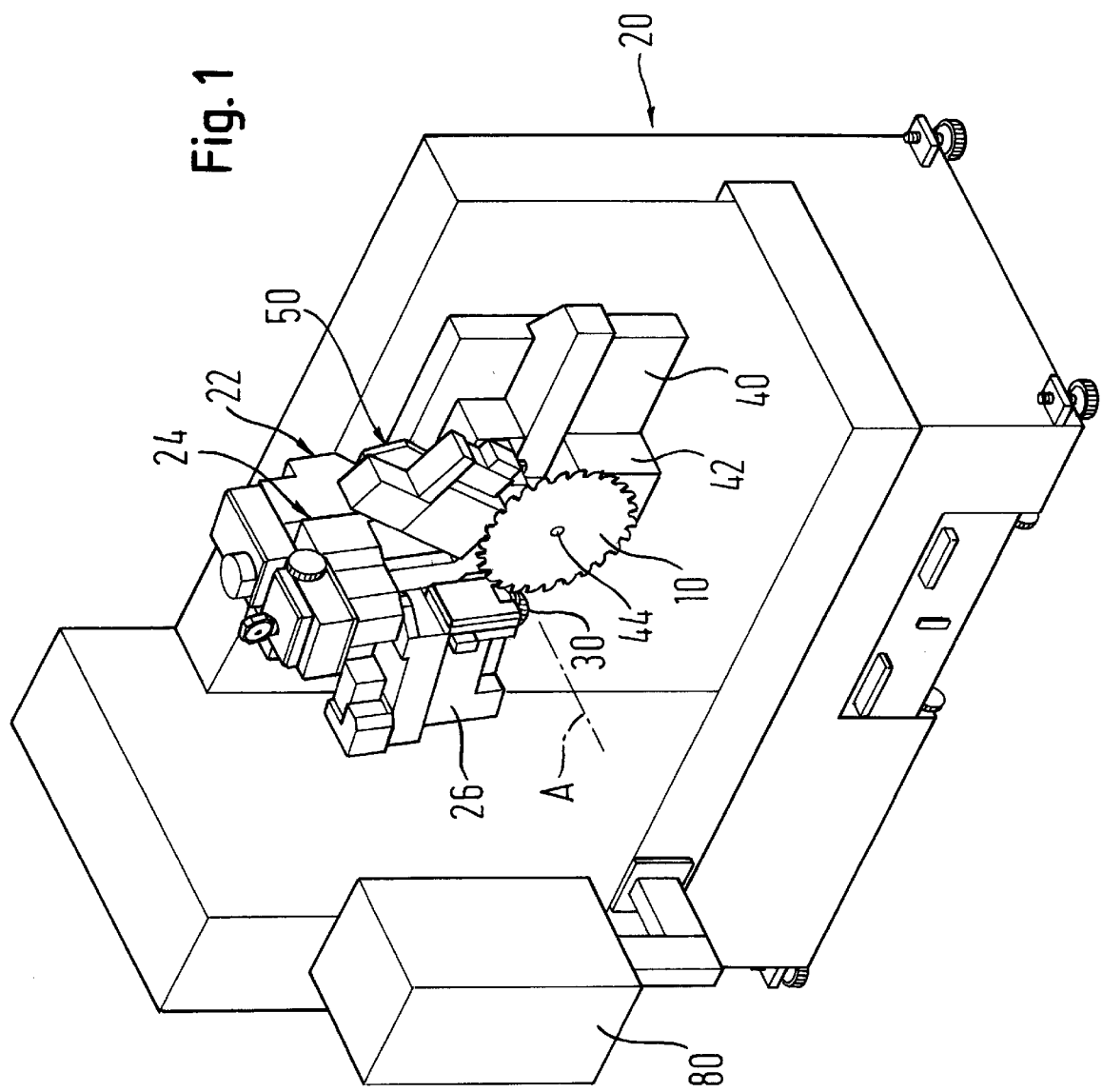
FIG. 1 is a view at an angle, showing a numerically controlled machine for grinding saw blades according to the invention.

The example shown of a workpiece 10 to be machined on the machine illustrated is a circular saw comprising hard metal trimmed cutting teeth 12, each of which is to be ground at its tooth face 14 and tooth flank 16 while its tooth tip 18 remains precisely in a predetermined position.

The machine shown comprises a machine bed 20 on which an elongate guide body 22 is supported for swinging adjustment about a pivot axis A which is horizontal in the embodiment illustrated. The pivot axis A is defined as the line of intersection of a vertical first reference plane B and a horizontal second reference plane C. A lift axis D extends along the guide body 22, intersecting the pivot axis A at a right angle and presenting the axis of movement of a reciprocating slide 24. A saddle 26 is guided on the reciprocating slide 24 for infeed movement along a spindle axis E which intersects the lift axis D at right angles and extends perpendicularly to the pivot axis A when in the normal position illustrated. From its normal position illustrated, the saddle 26 can be inclined in both directions about the lift axis. D. In the event that the cutting teeth 12 to be machined include teeth whose tooth face 14 or tooth flank 16 does not extend parallel to the pivot axis A, as illustrated, the saddle 26 is tilted with respect to the lift axis D in accordance with the inclination of the tooth face 14 or tooth flank 16 to be machined.

Figure 2:
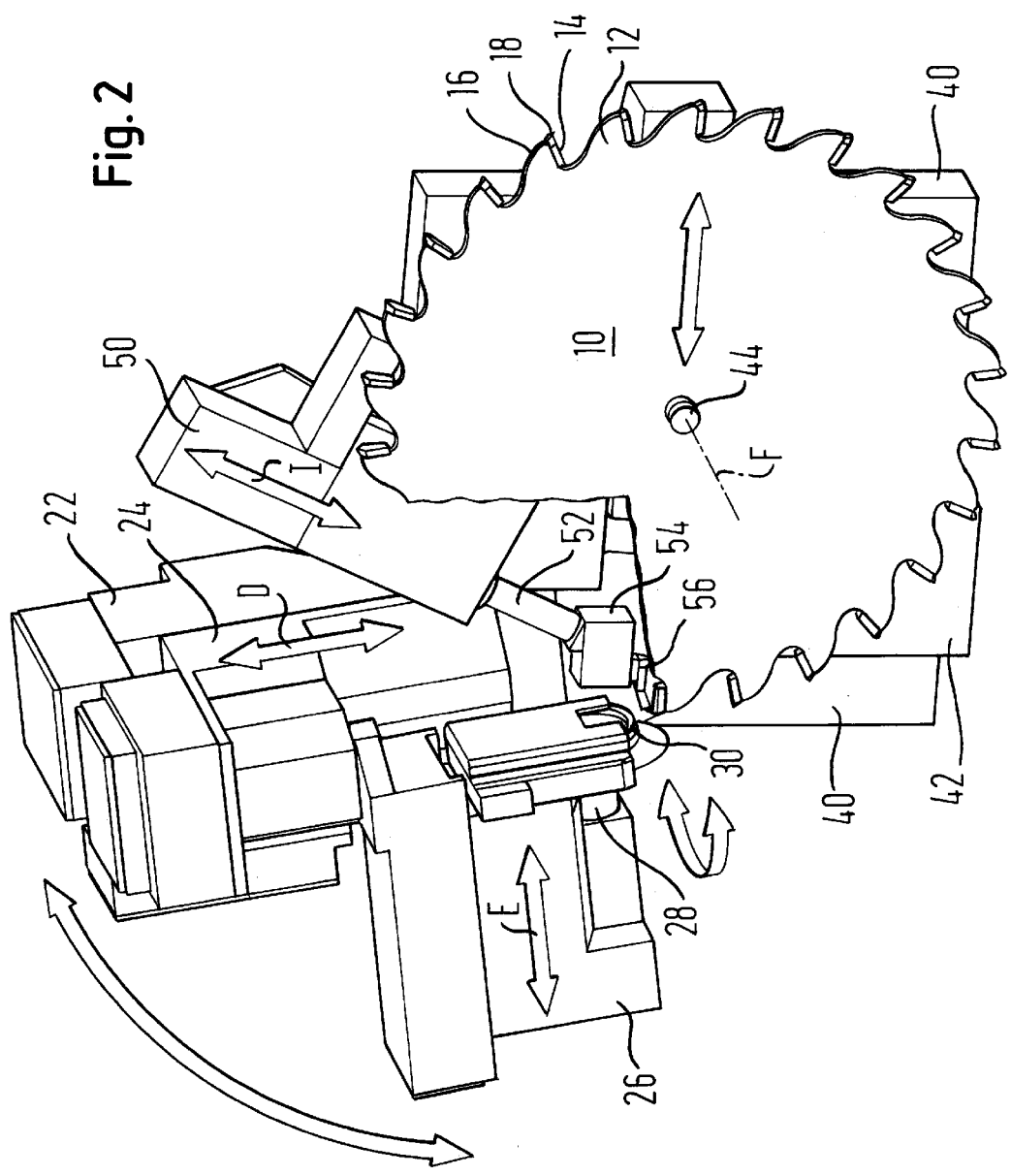
FIG. 2 shows an enlarged cutout of FIG. 1, seen in a slightly different direction of view, adjusted to grind the back of a tooth.
Figure 3:
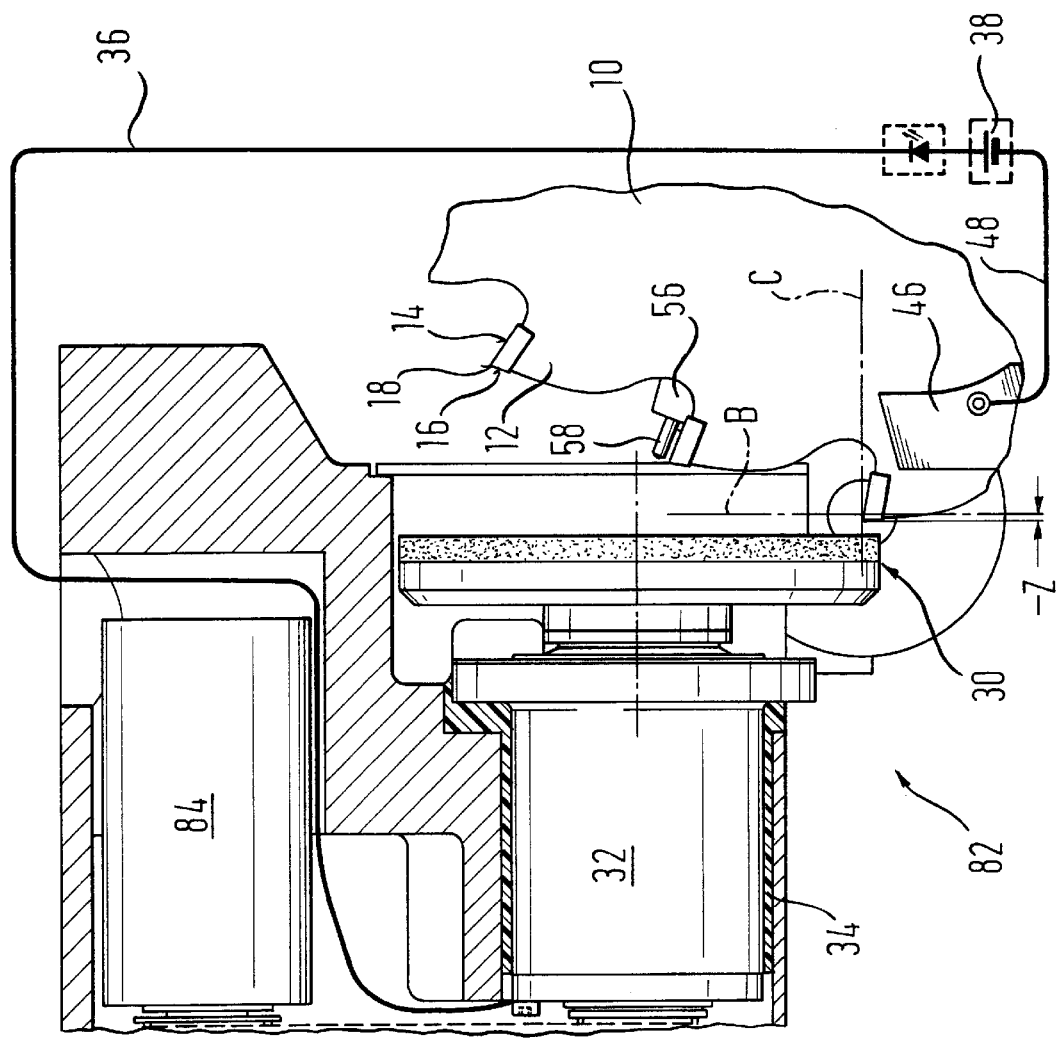
FIG. 3 shows a more enlarged cutout from the front.

The spindle axis E is the axis of a tool spindle 28 supported on the saddle 26 and adapted to be driven in rotation. A tool 30 for machining the workpiece 10 may be fastened to the tool spindle 28. In FIG. 2, the tool 30 is shown as a combination of grinding discs of known type, composed of a cup-shaped grinding disc and a plate-like grinding disc which are connected back to back. For the sake of simplicity, the tool 30 is illustrated in FIGS. 3 and 5 to 8 as a cup-shaped grinding disc only. These grinding discs or the grinding disc combination shown may be replaced by an erosion disc or a combination of two erosion discs serving as tool 30 for spark erosion machining of workpieces.

The tool spindle 28 is supported in a bearing box 32 which is mounted on the saddle 26 in electrically insulated fashion by means of an insulation sheath 34 and connected to a power source 38 by an electric cable 36.

A workpiece slide guide means 40 which is horizontal and stationary in the embodiment shown is disposed at the front of the machine bed 20 and so as to extend at right angles to the pivot axis A. A workpiece slide 42 carrying a workpiece support 44 is adapted to travel along the guide means 40. In the embodiment shown, including a circular saw blade as workpiece 10, the workpiece support 44 comprises a peg defining an axis of rotation F for the workpiece 10 in parallel with the pivot axis A. The workpiece 10 is centered on this peg. For machining the cutting teeth 12, the workpiece slide 42 should be in an operative position as illustrated in FIGS. 1 to 3, 8, and 9 at which the circular line around the axis of rotation F on which lie all the tooth tips 18 of the workpiece 10 intersects the pivot axis A. Thus the workpiece 10 can be rotated in stepwise fashion into machining positions such that one tooth tip 18 each will be located on the pivot axis A.

The central plane G of the workpiece 10 extending perpendicularly to the axis of rotation F, in other words vertically in the embodiment shown, is disposed such that it contains the lift axis D. In this position the workpiece 10 is clamped between two jaws 46 of a clamping means. The tooth tip 18 of the cutting tooth 12 to be machined is located at a point H at which the pivot axis A passes through the central plane G. The clamping means essentially is of known structure, but has a special feature in that one of the clamping jaws 46 is connected to the power source 38 by an electric cable 48 so that an electric circuit will be closed when the tool 30 comes to touch the workpiece 10.

To effect the stepwise advancing motion of the workpiece 10, being a rotational movement in the embodiment illustrated, the machine shown comprises an advance means 50 including a rod 52 which is adapted to be extended in controlled fashion along a feed axis I and carries an advance head 54 at its end. At the advance head 54, a cross slide 56 carrying an advance finger 58 is guided for displacement parallel to the pivot axis A. The cross slide 56 normally is in inoperative position, with the advance finger 58 remote from the central plane G. It is only when a movement to advance the workpiece is to be carried out that the cross slide 56 is moved, parallel to the pivot axis A, into a position at which the advance finger 58 enters into the tooth gap in front of the next cutting tooth 12 to be machined and, by extending the rod 52, presses against the tooth face 14 of this tooth to push it into the position described at which the tooth tip 18 coincides with point H.

Figure 4:
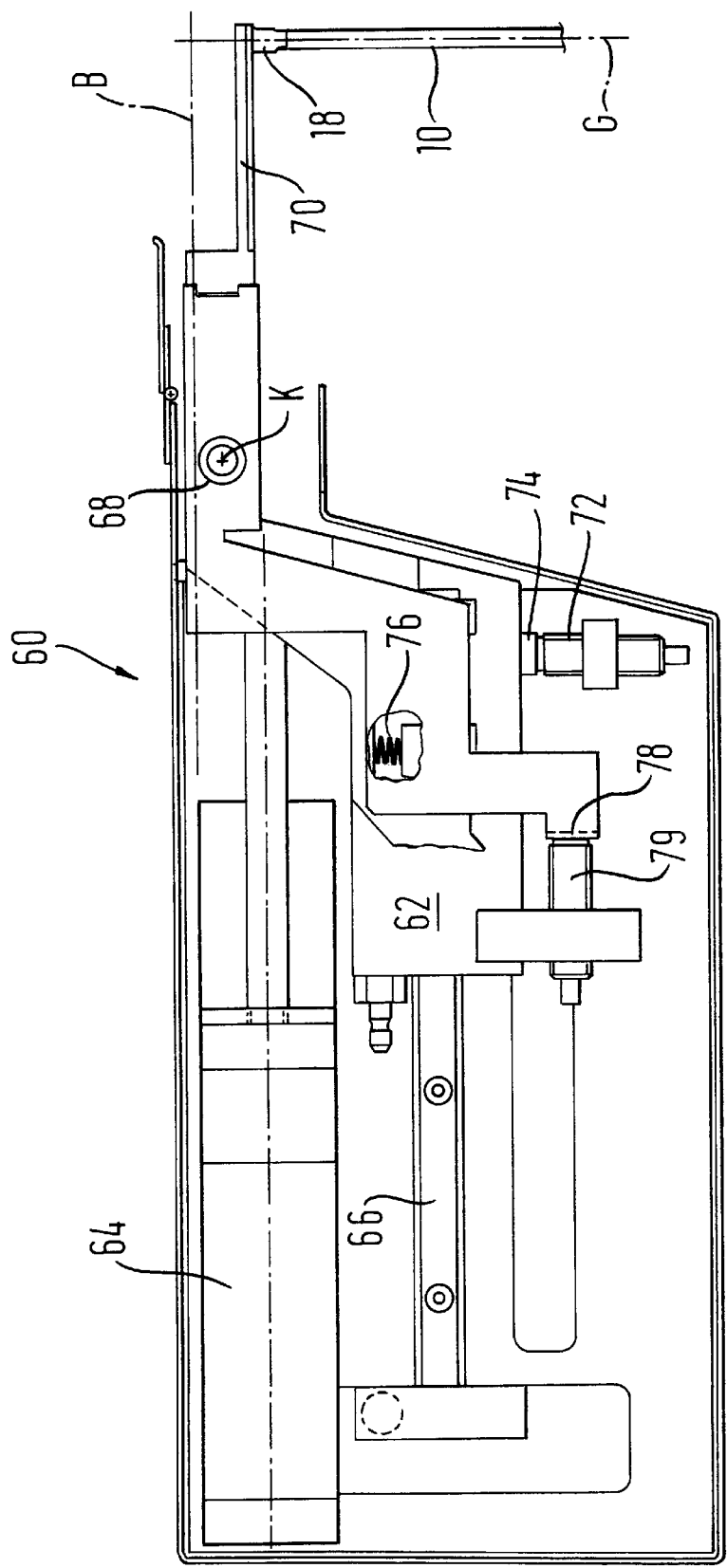
FIG. 4 is a top plan view of a feeler means of the machine.
Figure 7:
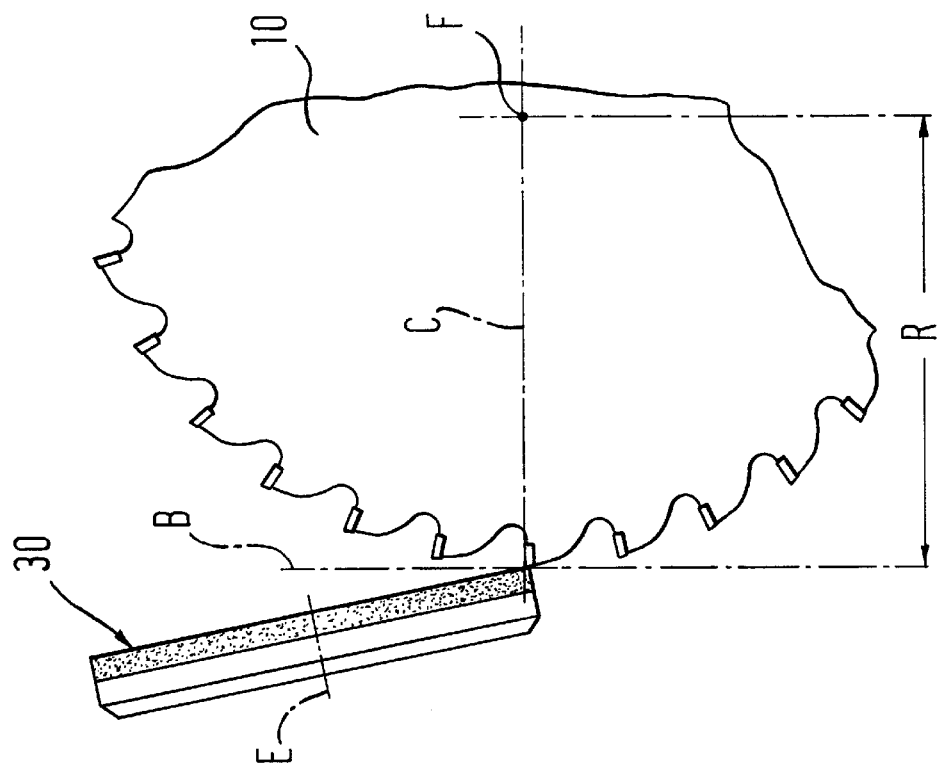
Figure 8:
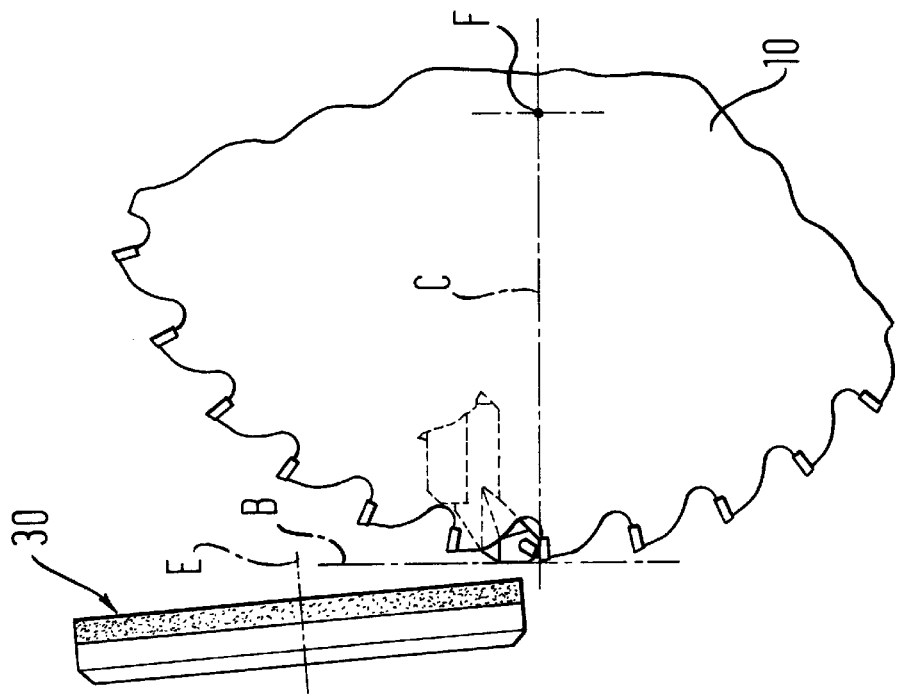

In the embodiment shown, the advance means 50 is controlled so as to repeat this procedure on the next successive cutting tooth 12 and, as a result, the latter finally remains in the position mentioned for subsequent machining once the workpiece 10 has been clamped between the clamping jaws 46. It may happen that the advance finger 58 does not engage in a tooth gap of the workpiece 10 immediately upon switch-on of the advance means 50 because, when donning the workpiece 10 and then pushing forward the workpiece slide 42, it has not been made sure that the tooth tip 18 of the first cutting tooth 12 to be machined lies in the second reference plane C already. For this reason, the following measures are provided in order to guarantee that indeed that will happen:

The machine comprises the shown in FIG. 4, a feeler slide 62 adapted to be moved back and forth by a pneumatic or hydraulic piston and cylinder unit 64 along a linear guide means 66 in parallel with the pivot axis A, i.e. perpendicularly to the central plane G, between an inoperative position and the sensing position illustrated in FIG. 4. A barrier 70 is supported on the feeler slide 62 by means of a joint 68, the joint 68 defining an axis of rotation K which extends parallel to the central plane G and to the first reference plane B, thus being perpendicular in the example illustrated. The barrier 70 extends parallel to the first reference plane B, being positioned ahead thereof by a distance X, and it has a length L, measured in the central plane G, which is greater than the greatest tooth pitch T occurring with workpieces 10 to be machined. Due to these relationships, indicated in FIG. 5, it is assured that the forward movement of the workpiece slide 42 with a workpiece 10 seated on its workpiece support 44 will be interrupted when the forwardmost tooth tip 18 is located at distance X from the second reference plane C.

The feeler slide 62 carries a switch 72, more specifically an electrically inductive limit switch, and there is a stationary abutment 74 associated with it. Like the reciprocating slide 24 and the saddle 26, the workpiece slide 42 is numerically controlled and, after the donning of a workpiece 10 to be machined on the workpiece support 44, it cannot be set to move until the switch 72 has signalled that the feeler slide 62 has been extended and consequently the barrier 70 has reached its sensing position, shown in FIG. 4. The barrier 70 usually is held by a spring 76 in the position shown in which it is parallel to the first reference plane B. But when tipped by a tooth tip 18, it swings about the axis of rotation K, touches an associated switch contact 78 and the latter then emits a signal to the numerical control means 80 of the machine. Thereby, the advancing motion of the workpiece slide 42 is interrupted, and thereupon the piston and cylinder unit 64 is actuated so that the feeler slide 62 together with the barrier 70 are retracted into the inoperative position of the feeler means 60. That clears the way for the workpiece 10, and the workpiece slide 42 is moved on by distance X so that the tooth tip 18 which had hit the barrier 70 reaches the first reference plane B in FIG. 6 and, by sheer coincidence, will come to lie more or less far above or below the second reference plane C, in other words it will not yet be located at the point of intersection H.

Next, the advance means 50 is actuated in the manner described above so that, ultimately, a tooth tip 18 be located in the second reference plane C. However, by virtue of the circular arc shape of the movement just carried out by the tooth tip 18, the tooth tip 18 has not remained in the first reference plane B but instead has surpassed it by a minor distance Z which, however, is not tolerable for machining. This distance Z must be determined by renewed scanning of the tooth tip 18 and then corrected.

The tool 30 adapted to be driven in rotation, either the cup-shaped or the plate-like grinding disc in the embodiment shown, is used for this renewed scanning. As the tool 30 is electrically conductive it is able to close an electric circuit via the electric cables 36 and 48 and the power source 38. For scanning, the tool 30 is not driven at its normal rotational operating speed, which usually is in the range of from 3000 to 5000 r.p.m. during grinding, in order to prevent the tooth tip 18 from becoming damaged. Instead the rotational speed is from 50 to 300 r.p.m., for example, i. e. in the order of magnitude of between 1% and 10% of the rotational operating speed. To this end, the tool 30 is driven by an electric motor 84 which is fed in per se known manner through a frequency converter. The slow rotational speed selected for scanning is sufficient to propel cutting emulsion, dirt, and the like away from the tool 30 and, moreover, makes sure that minor tumbling movements or chiseling out of the tool 30 will not affect the scanning accuracy.

The tool 30 thus is advanced by means of the saddle 26 until the tool lightly touches the tooth tip 18 facing it, thereby closing the electric circuit supplied from the power source 38 through the workpiece 10. That releases a signal which causes the control means 80 to compare the position adopted by the workpiece slide 42 with the position at which the workpiece slide was located when the workpiece 10 hit the barrier 70 and from which an approximation value Y characteristic of the workpiece 10 had been calculated, this being the approximate radius in the case of a circular saw blade. If it is found by the renewed scanning of the workpiece 10 that the tooth tip 18 thereof, which lies in the second reference plane C, projects beyond the first reference plane B by the distance Z the workpiece slide 42 is moved back by this distance Z and, as a consequence, the tooth tip 18 now will come to lie on the pivot axis A. The precise radius R of the workpiece 10 results from the equation $R=Y+Z$.

If the workpiece 10 should have roughing and finishing teeth of different heights the measuring procedure described is repeated so that a respective decisive radius or diameter of the workpiece 10 will be determined for both types of teeth.

Figure 9:
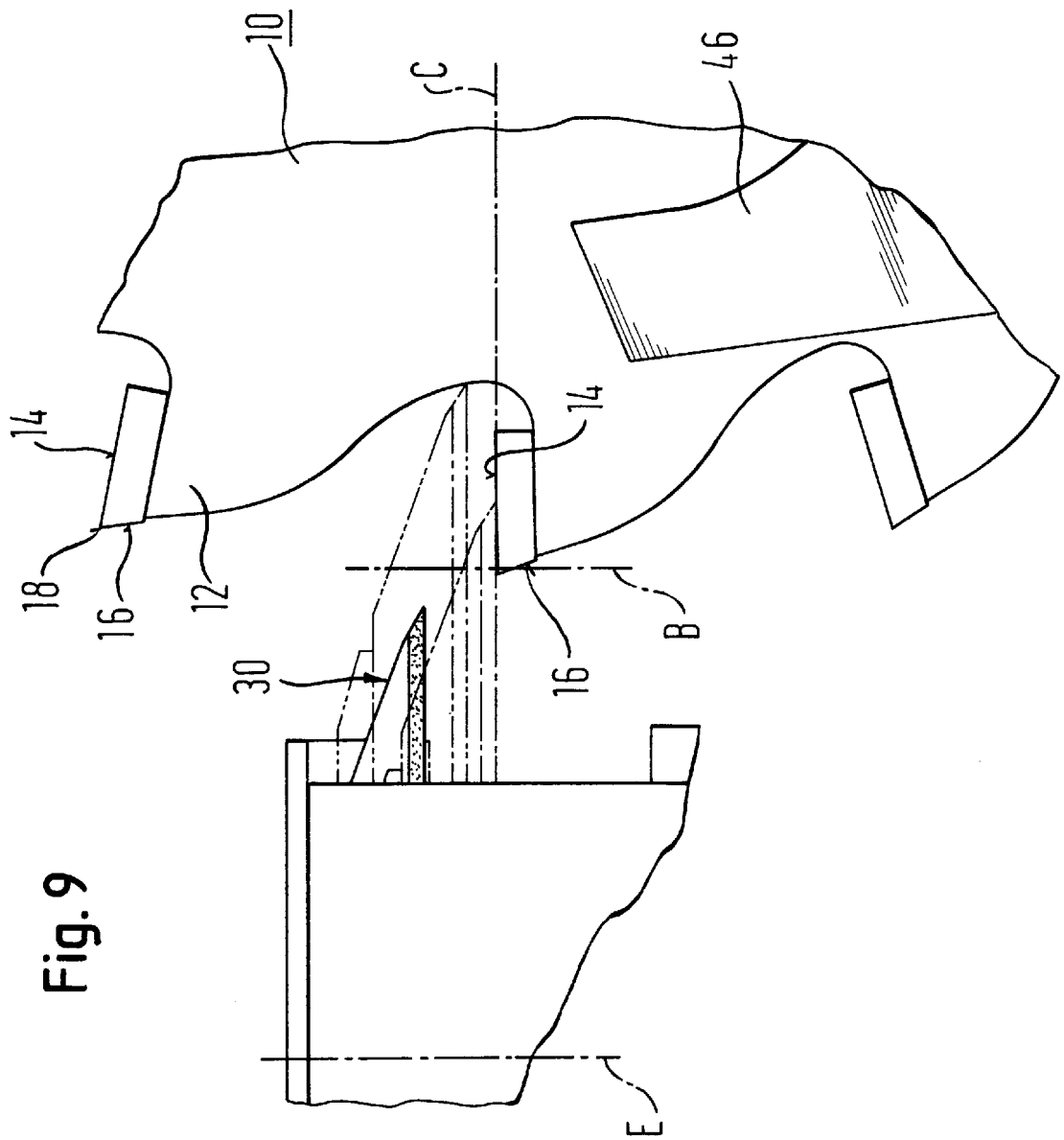
FIG. 9 is a view corresponding to FIG. 3 of the machine, equipped and adjusted to grind the face of a tooth.

The principle of scanning an electrically conductive workpiece 10 by means of a tool 30 which likewise is electrically conductive may be utilized for various measurements. For instance, as shown in FIG. 9, a plate-like grinding disc presenting the tool 30 may be used to sense the depth of the tooth gap of the workpiece 10 when the reciprocating slide 24 carries out a numerically controlled movement and, moreover, it may verify the position of the tooth face 14 by infeeding of the saddle 26.

The distance X may be selected to be shorter than illustrated if it is to be feared that inaccuracies in the positioning of the workpiece 10 might result from moving the workpiece slide 42 back and forth as described. In this event, the frontmost tooth tip 18 in FIGS. 5 and 6 will not reach the first reference plane B when the workpiece slide 42 moves through this distance X. And even after the advance of the workpiece 10 which brings the tooth tip 18 into the second reference plane C there still will be a distance +Z to be covered before the tooth tip 18 finally will reach the first reference plane B too and, therefore, lie on the pivot axis A. The distance +Z can be determined and corrected in a manner corresponding to the determination of −Z (FIG. 3) by using the tool 30 for scanning, in its capacity as a component of a measuring and correcting means 82.

What is claimed is:

1. A machine for machining workpieces (10) which have cutting teeth (12), especially saw blades, comprising
    a machine bed (20) on which a pivot axis (A) is fixed,
    a guide body (22) which defines a lift axis (D) extending transversely of the pivot axis (A),
    a reciprocating slide (24) which is guided on the guide body (22) for reciprocating along the lift axis (D), a saddle (26) which defines a spindle axis (E) extending transversely of the lift axis (D) and is guided on the reciprocating slide (24) for infeeding motion, a tool spindle (28) which is supported on the saddle (26) so as to be driven in rotation about the spindle axis (E) and is adapted to receive a tool (30) adapted to be driven in rotation, a workpiece slide guide means (40) which extends transversely of the pivot axis (A) and defines an adjustable angle with the lift axis (D), a workpiece slide (42) which is guided on the workpiece slide guide means (40) and defines a central plane (G), at right angles to the pivot axis (A), together with a workpiece support (44) integrally formed on the workpiece slide (42), a feeler means (60) which determines the distance of the cutting teeth (12) of the workpiece (10) from the workpiece support (44), adopting a measuring position, at least at times, which is reached by the tooth tip (18) of a cutting tooth (12), oriented in the direction of the pivot axis (A), of a workpiece (10) received in the workpiece support (44) when the workpiece slide (42) is shifted in the direction of the pivot axis (A) from a loading position remote from said pivot axis (A), an advance means (50) including an advance finger (58) adapted for intermittent engagement with a respective tooth face (14) so as to advance the same into a desired position at which it lies in a plane including the pivot axis (A), a numerical control means (80) for controlling movements of the saddle (26) and the workpiece slide (42) in response to signals from the feeler means (60) characterized in that the feeler means (60) comprises a barrier (70) the length(L) of which, as measured in said central plane (G) transversely of the workpiece slide guide means (40), is greater than the greatest tooth pitch (T) occurring of workpieces (10), the control means (80) is programmed such that the feeler means (60) becomes active before the advance means (50) so as to scan the tooth tip (18) of a cutting tooth (12) irrespective of the position of the corresponding tooth face (14), and the control means (80) furthermore is programmed such that the workpiece (10) is scanned once more at the tooth tip (18) of the cutting tooth (12) whose tooth face (14) is in the desired position, and the position of the workpiece slide (42) is corrected if said tooth tip (18) does not lie on the pivot axis (A).

2. The machine as claimed in claim 1, characterized in that a correcting means (82) separate from the feeler means (60) is provided for the renewed scanning of the workpiece (10) and for output of a correction signal.

3. The machine as claimed in claim 2, characterized in that the tool (30) itself provided for machining the workpieces (10) forms part of the correcting means (82).

4. The machine as claimed in claim 3, characterized in that the tool (30) is an electrically conductive member of an electric circuit which is closed through the workpiece (10).

5. The machine as claimed in any one of claims 1 to 4, characterized in that the barrier (70) is located a certain distance (X) ahead of the pivot axis (A), the control means (80) is programmed such that the workpiece slide (42) is advanced by this distance (X) whenever the control means has received a signal which is released as the cutting tooth (12) arrives at the barrier (70), and the control means (80) furthermore is programmed such that the advance means (50) does not become active until the workpiece slide (42) has travelled through said distance (X).

6. Machine as claimed in claim 5, characterized in that the advance means (50) is controlled such that its advance finger (58) engages in a respective first tooth gap of the workpiece (10), advances the cutting tooth (12) whose tooth tip (18) has been scanned by the feeler means (60) beyond the desired position of the tooth face (14) thereof, the advance finger (58) then retracts, skipping the next successive cutting tooth (12), the advance finger (58) then engages in the tooth gap following it and, during a renewed forward movement, advances the tooth face (14) of this next successive cutting tooth (12) into the desired position.

7. Machine as claimed in any one of claims 1 to 4, characterized in that the advance means (50) is controlled such that its advance finger (58) engages in a respective first tooth gap of the workpiece (10), advances the cutting tooth (12) whose tooth tip (18) has been scanned by the feeler means (60) beyond the desired position of the tooth face (14) thereof, the advance finger (58) then retracts, skipping the next successive cutting tooth (12), the advance finger (58) then engages in the tooth gap following it and, during a renewed forward movement, advances the tooth face (14) of this next successive cutting tooth (12) into the desired position.

* * * * *